United States Patent [19]

Del Re et al.

[11] 4,293,916

[45] Oct. 6, 1981

[54] APPARATUS FOR GENERATING SIGNALS SIMULATING THE OUTPUT OF A DEVICE FOR MEASURING A PHYSICAL VARIABLE

[75] Inventors: Pietrantonio Del Re, Bra; Pietro Fracassi, Milan, both of Italy

[73] Assignee: Carlo Gavazzi S.p.A., Milan, Italy

[21] Appl. No.: 82,479

[22] Filed: Oct. 9, 1979

[30] Foreign Application Priority Data

Oct. 31, 1978 [IT] Italy .............................. 29297 A/78

[51] Int. Cl.³ ............................................ G06F 15/20
[52] U.S. Cl. ................................... 364/571; 364/557; 364/578; 73/1 R; 73/362.5
[58] Field of Search .............. 364/578, 557, 488, 571, 364/550; 73/4 R, 1 R, 37, 362.5

[56] References Cited

U.S. PATENT DOCUMENTS

| | | | |
|---|---|---|---|
| 3,982,110 | 9/1976 | Kawai | 364/557 X |
| 4,089,058 | 5/1978 | Murdock | 364/578 X |
| 4,096,575 | 6/1978 | Itoh | 364/571 |
| 4,103,161 | 7/1978 | Thomasson | 364/571 X |
| 4,114,442 | 9/1978 | Pratt | 364/557 X |
| 4,122,719 | 10/1978 | Carlson et al. | 364/557 X |
| 4,198,677 | 4/1980 | Brunner et al. | 364/571 |

*Primary Examiner*—Edward J. Wise
*Attorney, Agent, or Firm*—Young & Thompson

[57] ABSTRACT

An apparatus for generating electric signals simulating the output of a device for measuring physical variable comprises a selector for choosing the type of measuring apparatus to be simulated, a measuring unit selector, a selector for selecting the value of a physical variable the measurement of which is to be simulated, a computer circuit controlled by the selectors and including a memory to contain information concerning the types of measuring apparatus that can be selected, and a device controlled by the computer circuit for supplying a simulated output signal to output terminals.

9 Claims, 2 Drawing Figures

APPARATUS FOR GENERATING SIGNALS SIMULATING THE OUTPUT OF A DEVICE FOR MEASURING A PHYSICAL VARIABLE

BACKGROUND OF THE INVENTION

This invention relates to an apparatus for generating electric signals for simulating the output of a measuring apparatus sensitive to a physical variable and providing an output electric signal, indicative of the measured physical variable. The physical variable may be temperature and thus the apparatus in question may be a thermocouple, a resistance thermometer or the like.

Devices which measure physical variables and which have an electric output have been used for a long time. In particular such devices have been used for a long time in connection with the measurement of temperature and reference may be made to thermocouples and resistance thermometers.

With particular reference to thermocouples these devices have been used in laboratories and in industrial plants as sensitive elements for measuring temperature and for a long time apparatus has been used which simulates the electric signals coming from such thermocouples, this apparatus being used to calibrate or adjust apparatus to operate in response to signals generated by the thermocouples.

It has been proposed to utilise, as an apparatus for simulating an electric signal coming from a thermocouple, a potentiometric bridge. Such a potentiometric bridge can be considered to comprise an emf (electromotive force) generator and means for providing an adjustable measured emf, derived from that emf generator. It has been proposed to connect such a potentiometric bridge to a thermocouple temperature measuring instrument, the bridge taking the place of a thermocouple itself, so that the temperature measuring instrument can be checked and so that, if necessary, the calibration of the temperature measuring instrument can be adjusted. In skilled hands such a potentiometric bridge may produce an emf which is equal to the emf which a thermocouple, being simulated by the bridge, would generate at a specific desired temperature.

However, it is to be appreciated that the method of ensuring that the potentiometric bridge generates an emf equal to that generated by a specific thermocouple at a desired temperature is complicated, for the reasons that are set out below.

There are various types of thermocouple that are in common use, these different types of thermocouple utilising different types of junction. Each specific type of thermocouple has its own characteristic output curve and thus each type of thermocouple produces a different emf at any specific given temperature and the correspondence between the temperature and output emf is not easy to express algebraically. Consequently a person utilising a potentiometric bridge to simulate a thermocouple must utilise suitable conversion table to find the value of the emf that the thermocouple in question should produce at the desired temperature so that the potentiometric bridge may be operated to produce the corresponding emf. Alternatively the operator of the potentiometric bridge must have a number of scales for use with the bridge each scale being calibrated directly in terms of temperature, the appropriate scale being used in conjunction with the bridge with any secific type of thermocouple.

A further complication is that at the present time two different temperature measuring scales are in common use, namely the Celsius or centrigrade scale and the Fahrenheit scale. Consequently, in view of the difficulties described above, it will be necessary for an operator of the potentiometric bridge to have two sets of conversion tables or alternatively two sets of reading scales.

A further factor that adds to the complication of utilising a potentiometeric bridge is due to the fact that when a thermocouple is in use one junction of the thermocouple, normally termed the "cold" junction is kept at a constant reference temperature which is normally 0° C., namely the temperature of melting ice. The other junction of the thermocouple is at the temperature which is to be measured and the scales or tables mentioned above will be prepared on the assumption that the cold junction is at the reference temperature. However, in practice, some thermocouples may be operated with the "cold" junction at a temperature which is not 0° C. and if this is the case, before the emf for any particular measured temperature taken from the table is simulated by the potentiometric bridge it is necessary to subtract from that emf the emf shown on the table at the temperature that the "cold" junction actually has, the difference between these two emf's being simulated by the potentiometric bridge.

Yet a further difficulty associated with the use of a potentiometric bridge is that, before a potentiometric bridge can be used it is usually necessary to carry out some preliminary checking operations, known as "standardization", to ensure that the emf actually being generated by the potentiometric bridge is correct. These preliminary operations are relatively long, and normally have to be carried out periodically during the use of the potentiometric bridge. The reason that these preliminary operations have to be carried out is that a potentiometric bridge usually utilises a cell or battery as the primary source of emf, and the emf generated by such a source can vary during operation of the potentiometric bridge by virtue of polarization within the battery or cell, or by virtue of changes in temperature of the cell or battery, or for other causes. Of course, in due time such a battery will become exhausted and then the emf produced by such a battery will fall.

It is to be appreciated that whilst the above discussion has concentrated on the simulation of the emf generated by a thermocouple, similar problems also occur in connection with the simulation of the output signals generated by resistance thermometers, since again each resistance thermometer will have a characteristic curve which must be tabulated to some extent. It is to be appreciated, of course, that similar problems occur generally whenever it is desired to simulate the electric output of a device which is sensitive to a physical variable and which provides an electric output which is indicative of the instantaneous value of that physical variable. This is especially the case when the output is not linearly dependent upon the physical variable to be measured.

SUMMARY OF THE INVENTION

The present invention seeks to overcome the above described disadvantages and more particularly, in particular connection with the case of a thermocouple, seeks to avoid the need to provide conversion tables or various reading scales, seeks to avoid the need to carry out the preliminary standardization operations and seeks to avoid the need to measure any variable parameters which may influence the outputs of the said means which is sensitive to physical variables, for example, the temperature of the cold junction of a thermocouple.

The present invention solves all the above problems by providing a computer which can be fed directly with the value of the measured physical variable the measurement of which is to be simulated and which can automatically cause an appropriate output signal to be simulated. Thus the invention is characterised in that an apparatus in accordance with the invention comprises a selector for choosing a type of measuring apparatus to be simulated, a measuring unit selector a selector for selecting the value of a physical variable, the measurement of which is to be simulated, a computer circuit controlled by said selectors and including a memory to contain information concerning the types of measuring apparatus that can be selected, and means controlled by said computer circuit for supplying simulated output signals to output terminals.

Preferably the selector for selecting the value of the physical variable comprises a key board and a display device may be provided to display the selected value.

The computer may be adapted to be controlled to provide a continuous or predetermined alteration in the selected value of the physical variable the measurement of which is to be simulated, the instantaneous value being displayed by the display device. Thus the selected value may be steadily increased or decreased, or may be rapidly increased or decreased by a predetermined amount.

Advantageously means are provided for comparing calculated output signals as supplied to the output terminals with reference signals and for adjusting the computer to obviate any errors or drifts. Thus standardization may be carried out automatically. The standardization procedure may be initiated by operation of a push button or may be initiated automatically at predetermined intervals of time.

A preferred embodiment of the invention is adapted to simulate the output emf generated by a thermocouple and the selector for selecting the type of measuring apparatus to be simulated is operable to select the type of thermocouple to be simulated, and the selector for selecting the measuring scale is operable to select degrees centigrade or degrees fahrenheit.

Advantageously means are provided for automatically compensating the output signal supply to the terminals in response to changes in the temperature of the cold junction of thermocouple being simulated.

Preferably the memory comprises inter-changeable memory elements to permit elements to be readily replaced. This enables the apparatus readily to be adjusted to operate in different circumstances.

Advantageously the apparatus is operable to provide a specified emf, and thus, in one mode of operation, an emf specified on the key board may be directly generated at the output terminals.

It is to be appreciated that the computer circuit may comprise a micro-processor.

The invention offers the advantages that an output signal generated by a device such as a thermocouple may be readily simulated and without lengthy procedure being adopted.

BRIEF DESCRIPTION OF THE DRAWINGS

In order that the invention may be more readily under stood and so that further features thereof may be appreciated the invention will now be described by way of example with reference to the accompanying drawings in which.

DESCRIPTION OF THE PREFERRED EMBODIMENT

Figure 1:
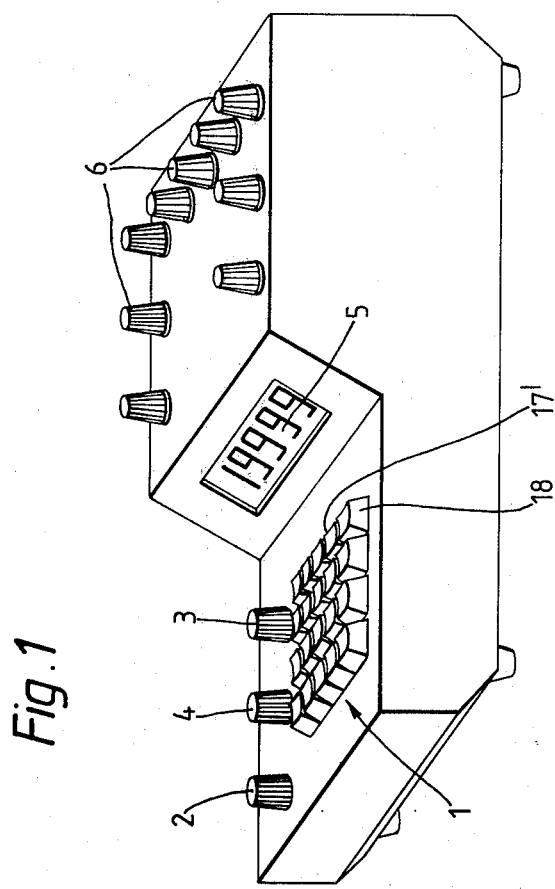
FIG. 1 is an external perspective view of an apparatus in accordance with the invention which is specifically adapted to generate emf's for simulating a thermocouple.

Referring initially to FIG. 1 an apparatus in accordance with the invention has an external appearance which is similar to that of the desk-top calculator or computer. The apparatus comprises a manually operated keyboard 1, various selection knobs 2, 3 and 4, a numerical display window 5 and a set of terminals 6.

Figure 2:
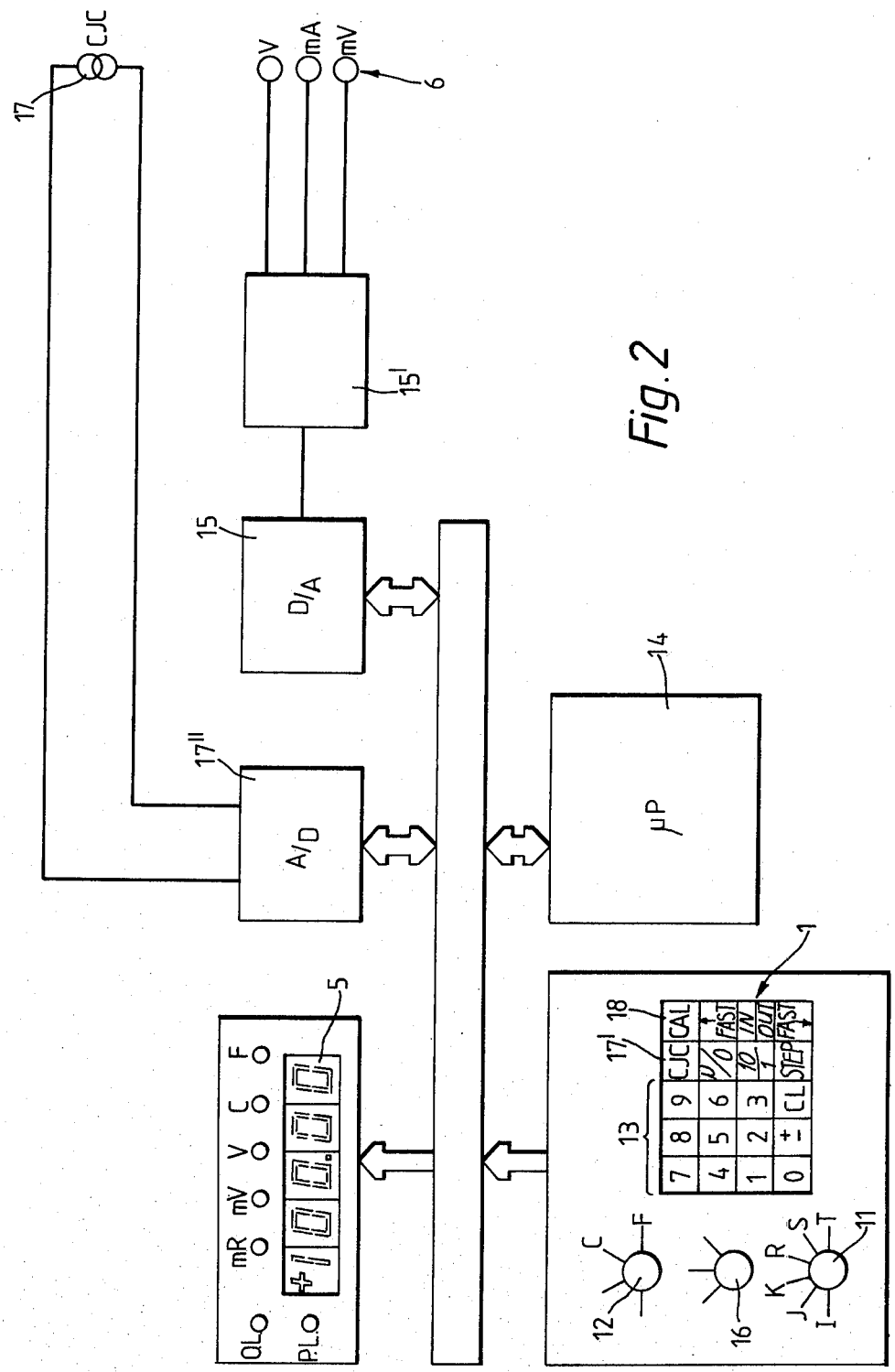
FIG. 2 is a block diagram of the circuitry of the apparatus of FIG. 1.

Turning now to FIG. 2 of the accompanying drawings the various control devices are shown in the box at the bottom left hand corner of FIG. 2. One control device, which is operated by rotating the knob 2 of FIG. 1, comprises a thermocouple characteristics selector 11, and this device enables the operator of the apparatus, by manipulating knob 2, to select one out of six different kinds of thermocouple each of which, of course, has its own characteristic curve. It will be appreciated from the following description that details of the six different curves are stored in suitable store circuits or memory of the apparatus and that the operation of the selector 11 will activate the appropriate store circuits or appropriate part of the memory. Of course the thermocouple type selected by the selector 11 determines the type of thermocouple that is simulated during the subsequent operation of the device. Whilst reference is made to the storing of six characteristic curves for thermocouples it is to be appreciated that in other embodiments of the invention more than six curves may be stored and it is also to be appreciated that in different embodiments in which six curves are stored the curves stored in the embodiments may differ so that one embodiment may operate with a different selection of thermocouple types than a second embodiment.

The apparatus also includes a measuring unit selector 12 which is controlled by operating knob 3. The measuring unit selector determines whether the apparatus will operate in terms of °C. or °F. Depending on the position of the knob 3 an internal electric circuit is adapted to use the usual conversation equation for converting °C. into °F., or vice versa, so that it is only necessary to utilise a single stored characteristic curve.

As can be seen from FIG. 2 the keyboard 1 comprises a portion 13 which comprises the digits 1 to 9, and this keyboard can be utilised by an operator for example to indicate the temperature value that is to be simulated. Thus the operator, by pressing a sequence of the keys of the keyboard 1 can directly specify the required temperature in °C. or °F. The arrangement is such that the temperature specified by operation of the keyboard and the measuring unit used is numerically displayed by the display device 5.

The described apparatus also includes an electronic computer circuit 14 which performs the calculations required for finding the emf which corresponds to the designated temperature and the selected type of thermocouple. The computer performs its functions by determining which thermocouple type has been specified, determining the temperature specified and obtaining the emf from the appropriate characteristic curve which is, as mentioned above, stored in a memory or memory circuit which forms part of the computer. The memory circuits may be replaceable to permit the apparatus to be adapted for other functions. The thus-calculated value of the resultant emf, in numerical form, is transferred to a digital analog converter 15 which produces the required emf via a signal processing unit 15', this output signal being available at output terminals 6. The electronic computer circuit can be realized in many ways according to the technique known in the field. It is however advisable to adopt an electronic circuit based on a microprocessor. For example, in a practical embodiment of the apparatus according to the invention, as carried out by the Assignee, the electronic computer circuit comprises a microprocessor of the type sold by R.C.A. under the name of "COSMAC" and five memory circuits of the "PROM" type, said memory circuits having stored therein the characteristic curves or data of the thermocouples to be simulated and the instructions for use of said curves or data.

The apparatus may further comprise a display and/or operation selector 16 which is controlled by operation of the knob 4. This selector may operate so that, in one position the numbers displayed in the display device or window 5 will be representative of the temperature specified by operating the keyboard and in another position the numbers displayed on the display device or window will be representative of the actual emf generated by the apparatus, which emf has been specified by operation of the switch board.

The apparatus may also include a compensation device 17 controlled by a key 17' forming part of the keyboard 1. By operating this key the operator is able to choose whether compensation is to be made automatically for the temperature of the cold junction of the thermocouple. If compensation is not required the emf corresponding to the emf generated by the thermocouple when the cold junction is 0° C. is provided at the terminal C. If, however, automatic compensation is required a temperature sensor which senses the actual temperature of the cold or reference junction of the thermocouple is actuated and a suitable circuit 17" determines the temperature and provides a digital output signal representative of the signal, this digital signal being forwarded to the computer circuit 14. The computer makes the appropriate calculation and determines the emf which the thermocouple of the thermocouple type selected would produce if the cold junction were at the temperature being measured by the said temperature sensor, and the corresponding calculated emf is supplied at the terminals 6.

The apparatus also includes a standardization device controlled by key 18 in the keyboard 1. When the apparatus is in operation the key 18 may be pressed for automatic standardization to be performed, thus checking for any drifts of the apparatus by comparing an appropriate calculated emf with an internal specified emf. If any drifts have taken place the computer parameters are automatically adjusted to obviate any errors. In another embodiment standardization may be performed totally automatically at predetermined intervals of time during operation of the device.

Keyboard 1 also has further auxiliary keys for automatically carrying out additional operations, which may be required for rapidly checking the calibration of the measuring instrument. More particularly various auxiliary keys may be operated in order to obtain, firstly a continuous high speed or low speed increase or decrease in the generated emf, the corresponding temperature value, in the selected temperature scale, being directly displayed in the window 5, or an increase or decrease of the specified temperature by a preselected amount thus resulting in an immediate corresponding change of the generated emf without a fresh input having to be made to the apparatus.

It is to be appreciated that the terminal 6 may be utilised to obtain other auxiliary outputs in addition to an emf output which simulates the emf output of a thermocouple. For example the apparatus may be used to provide a current output or a voltage output to enable the above described apparatus to be used as a generator for generating electric signals of any appropriate type for simulating electric signals generated by device measuring a physical parameter, which need not necessarily be temperature.

It should be mentioned that the measuring unit selector 12 can be utilised so that operation of the apparatus is reversed so that the apparatus measures the emf coming from a thermocouple and numerically displays the corresponding temperature in °C. or °F.

The method of measurement utilised in this particular way of operating the device is known under the name "analog/digital converter with successive approximations".

It is to be appreciated that whilst the apparatus has been described above with specific reference to the simulation of output signals generated by thermocouples the apparatus, or a corresponding apparatus, can be used in many other situations simply by changing the contents of the memories holding the said characteristic curves, and by modifying the action of the various selectors. It is to be appreciated that where appropriate minor modifications are made the apparatus can be used to simulate electric signals coming from various means sensitive to physical variables. For example signals may be simulated which come from pressure measuring devices, flow rate measuring devices, level measuring devices, pH measuring devices, salinity measuring devices or conductivity measuring devices and, of course, other temperature sensitive devices such as resistance thermometers, thermistors or the like. This can be done irrespective of the complexity of the relation between the electric signal and the measured variable and in all cases the value of the simulated variable can be displayed in a numerical form with reference to conventional units.

The above described apparatus may be of the portable kind and can be powered by rechargeable battery or may be provided with a plug and lead to enable the device to be operated from the mains power system.

We claim:

1. An apparatus for generating electric signals for simulating the output of a measuring apparatus sensitive to a physical variable and providing an output electric signal indicative of the measured physical variable comprising a selector for choosing the type of measuring apparatus to be simulated, a measuring unit selector, a selector for selecting the value of a physical variable the measurement of which is to be simulated, a computer circuit controlled by said selectors and including a memory to contain information concerning the types of measuring apparatus that can be selected, and means controlled by said computer circuit for supplying a simulated output signal to output terminals.

2. An apparatus according to claim 1 in which said selector for selecting the value of the physical variable comprises a keyboard, and a display device is provided to display the selected value.

3. An apparatus according to claim 2 in which said computer is adapted to be controlled to provide a continuous or predetermined alteration in the selected value of the physical variable the measurement of which is to be simulated, the instantaneous value being displayed by the display device.

4. An apparatus according to claim 1 and means for comparing calculated output signals as supplied to the output terminals with reference signals and for adjusting the computer to obviate any errors or drifts.

5. An apparatus according to claim 1 in which the apparatus is adapted to simulate the output emf generated by a thermocouple, said selector for selecting the type of measuring apparatus to be simulatd being operable to select the type of thermocouple to be simulated, and said selector for selecting the measuring scale being operable to select °C. or °F.

6. An apparatus according to claim 5 and means for automatically compensating the output signal supplied to the terminals in response to changes in the temperature of the cold junction of the thermocouple being simulated.

7. An apparatus according to claim 1 in which said memory comprises interchangeable memory elements to permit elements to be readily replaced.

8. An apparatus according to claim 1 operable to provide a specified emf.

9. An apparatus according to claim 1 in which said computer circuit comprises a microprocessor.

* * * * *